(12) United States Patent
Wu et al.

(10) Patent No.: US 8,433,062 B2
(45) Date of Patent: *Apr. 30, 2013

(54) TILTING PORTABLE ELECTRONIC DEVICE

(75) Inventors: Kun-Tsan Wu, Shindian (TW);
Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 536 days.

This patent is subject to a terminal disclaimer.

(21) Appl. No.: 12/825,477

(22) Filed: Jun. 29, 2010

(65) Prior Publication Data

US 2011/0156559 A1   Jun. 30, 2011

(30) Foreign Application Priority Data

Dec. 31, 2009   (CN) .......................... 2009 1 0312770

(51) Int. Cl.
*H04M 1/00* (2006.01)
(52) U.S. Cl.
USPC .................................. 379/433.12; 455/575.4

(58) Field of Classification Search ............. 379/433.12; 455/575.4; 16/364
See application file for complete search history.

(56) References Cited

U.S. PATENT DOCUMENTS

| 8,086,290 | B2 * | 12/2011 | Yoon et al. ................. | 455/575.4 |
| 8,190,219 | B2 * | 5/2012 | Park et al. .................. | 455/575.4 |
| 8,307,510 | B2 * | 11/2012 | Chuang et al. .................. | 16/364 |

* cited by examiner

*Primary Examiner* — Simon Sing
*Assistant Examiner* — Van D Huynh
(74) *Attorney, Agent, or Firm* — Altis Law Group, Inc.

(57) ABSTRACT

A tilting portable electronic device includes a housing, a cover, a sliding mechanism connecting to the housing and the cover, and at least one swing rod rotatably connecting to the cover and the housing. The sliding mechanism includes a fixing plate, a sliding plate, and an elastic member connecting the fixing plate and the sliding plate. The fixing plate is secured to the housing, the sliding plate rotatably connects to an end of the cover, the cover is pushed, the sliding plate slides to the end of the cover, the swing rod rotates to lift the other end of the cover, after the sliding plate slides over a predetermined distance. The elastic member releases energy to drive the sliding plate slide automatically, and the cover opens slantingly relative to the housing.

15 Claims, 5 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| Attorney Docket No. | Title | Inventors |
| --- | --- | --- |
| US31622 | TILTING PORTABLE ELECTRONIC DEVICE | Kun-Tsan Wu et al. |
| US31623 | TILTING PORTABLE ELECTRONIC DEVICE | Kun-Tsan Wu et al. |
| US31625 | TILTING PORTABLE ELECTRONIC DEVICE | Kun-Tsan Wu et al. |
| US31630 | TILTING PORTABLE ELECTRONIC DEVICE | Kun-Tsan Wu et al. |
| US31631 | TILTING PORTABLE ELECTRONIC DEVICE | Kun-Tsan Wu et al. |
| US31809 | TILTING PORTABLE ELECTRONIC DEVICE | Kun-Tsan Wu et al. |
| US32117 | TILTING PORTABLE ELECTRONIC DEVICE | Kun-Tsan Wu et al. |
| US32128 | TILTING PORTABLE ELECTRONIC DEVICE | Kun-Tsan Wu et al. |

BACKGROUND

1. Technical Field

The present disclosure relates to tilting portable electronic devices.

2. Description of Related Art

Conventional portable electronic devices can be classified into three different categories, bar-type devices, rotating-type devices, and sliding-type devices.

All three types of these electronic devices have the same following problems. When a user wants to watch a display of the electronic device resting on a table, they must use external support to hold it in a tilted position to give the display a better viewing angle. Alternatively, the user may hold the electronic device with his hands to get the proper viewing angle, however, it may become uncomfortable after a long time of viewing.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
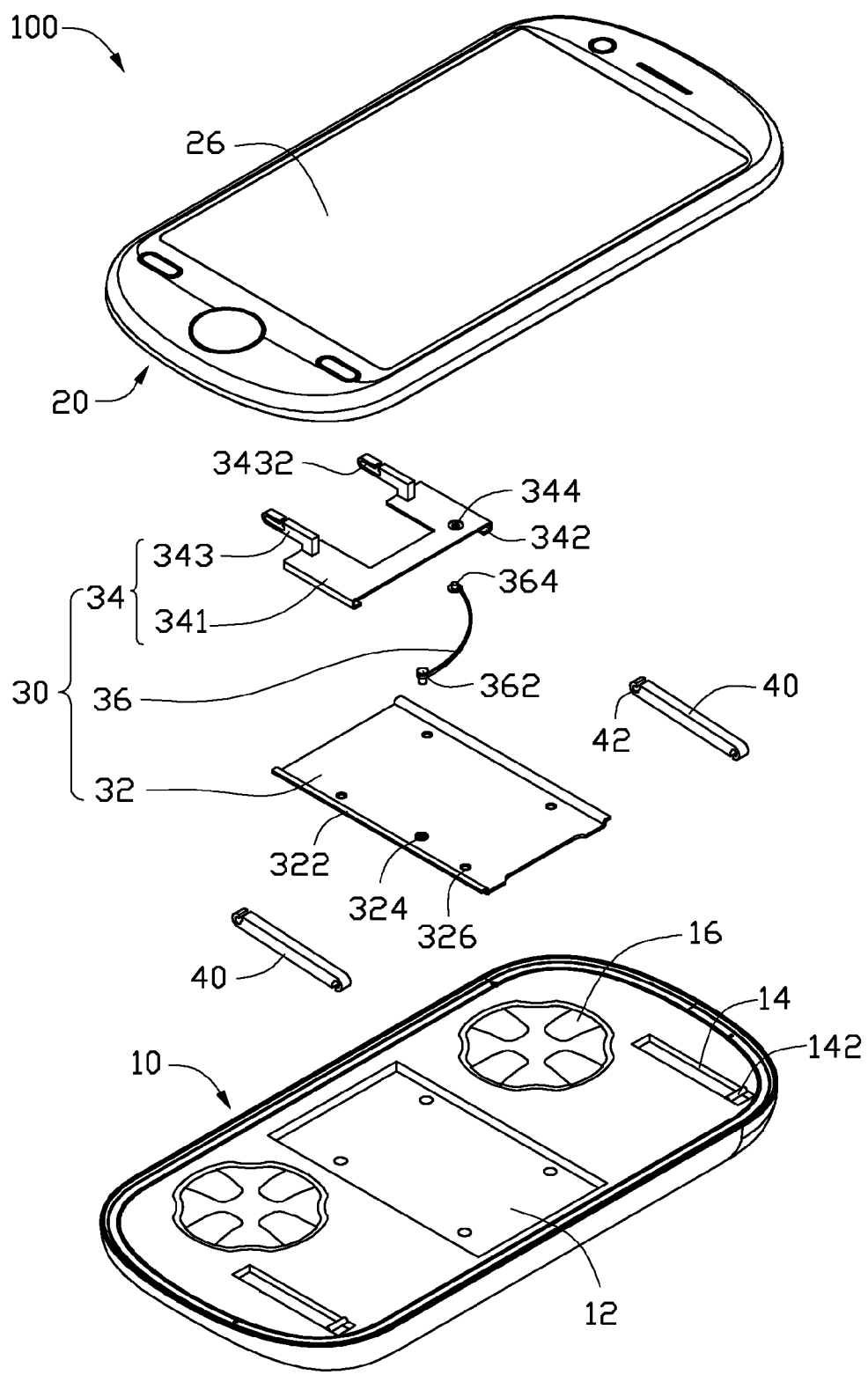
FIG. 1 is an exploded view of a tilting portable electronic device, according to an exemplary embodiment.

FIG. 1 shows a tilting portable electronic device 100, such as mobile phones, personal digital assistants (PDAs), or digital cameras, including a housing 10, a cover 20, a sliding mechanism 30, and two swing rods 40. The cover 20 can slide and tilt relative to the housing 10. The sliding mechanism 30 is slidably connected to the housing 10 and the cover 20. The swing rods 40 are rotatably connected to the housing 10 and the cover 20. The sliding mechanism 30 and the swing rods 40 cooperatively support the cover 20 slanted relative to the housing 10.

The housing 10 defines an assembling cavity 12 and two first receiving slots 14 at the upper surface. The assembling cavity 12 is located near the middle of the upper surface and receives the sliding mechanism 30. Each first receiving slot 14 is located adjacent to one of the sides of the upper surface, extending along the sliding direction of the cover 20. Each first receiving slot 14 has a first connecting shaft 142 assembled at an end substantially adjacent to the outside of the housing 10. The connecting shaft 142 rotatably connects to an end of the swing rod 40. The housing 10 may include two keypads 16 on the upper surface.

Figure 2:
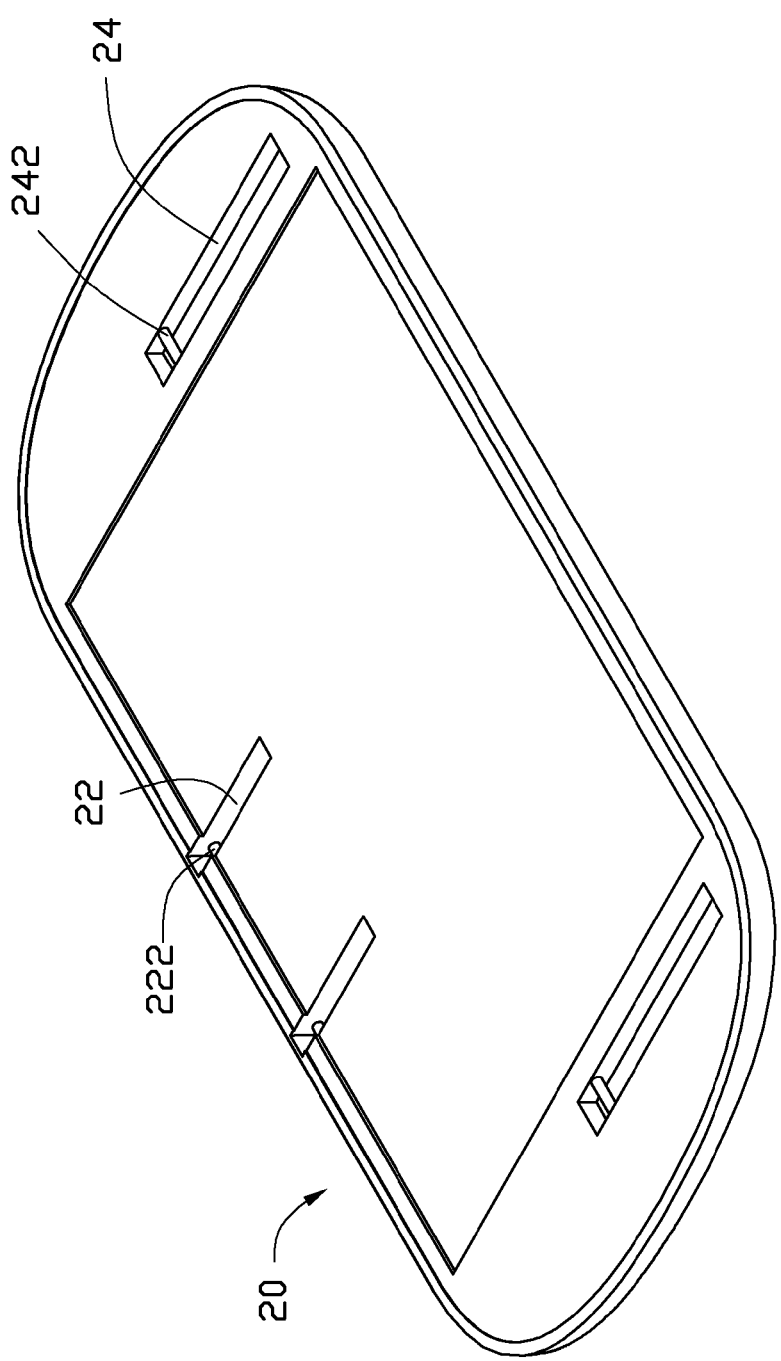
FIG. 2 is an isometric back view of a cover of the electronic device shown in FIG. 1.

Referring to FIG. 2, the cover 20 defines two connecting slots 22 and two second receiving slots 24 in the bottom surface. The two parallel connecting slots 22 are arranged substantially adjacent to an end of the bottom surface. Each connecting slot 22 has a linking post 222 assembled at an end substantially adjacent to the outside of the cover 10, and the linking posts 222 are used to rotatably connect with the sliding mechanism 30. Each second receiving slot 24 is arranged substantially adjacent to one of the sides of bottom surface, corresponding to the two first receiving slots 14. Each second receiving slot 24 has a second connecting shaft 242 assembled at an end substantially adjacent to the middle of bottom surface. The second connecting shaft 242 rotatably connects to the other end of the swing rod 40. The cover 20 forms a display 26 on an opposite top surface.

The sliding mechanism 30 includes a fixing plate 32, a sliding plate 34 and an elastic member 36 between the fixing plate 32 and the sliding plate 34. The fixing plate 32 can be secured in the assembling cavity 12. The fixing plate 32 respectively forms a stepped guiding rail 322 at each side. The fixing plate 32 defines a first fixing hole 324 and a plurality of position holes 326. The first fixing hole 324 is located near the middle of the fixing plate 32 and substantially adjacent to a guiding rail 322. The first fixing hole 324 is configured for securing an end of the elastic member 36 with the fixing plate 32. The position holes 324 are arranged substantially adjacent to two sides of the fixing plate 32 for securing the fixing plate 32 in the assembling cavity 12.

The sliding plate 34 includes a plate portion 341 and two parallel extending arms 343 extending from an end of the plate portion 341. The plate portion 341 is shorter than the fixing plate 32. The plate portion 341 respectively forms guiding grooves 342 for slidably engaging with the guiding rails 322 of the fixing plate 32. The guiding groove 342 can be formed by folding the edges of the plate portion 341. The plate portion 341 forms a second fixing hole 344 substantially adjacent to a side of the plate portion 341. The second fixing hole 344 is configured for securing the other end of the elastic member 36 with the sliding plate 32. Each extending arm 343 can be received in one of the connecting slots 22 of the cover 20. Each extending arm 343 defines a hinging hole 3432 to rotatably engage with the linking posts 222 of the cover 20.

The elastic member 36 can be a leaf spring, coil spring, or torsion spring. The elastic member 36 includes a first connecting end 362 and a second connecting end 364. The first connecting end 362 and the second connecting end 364 can be annular. Pins can latch the first connecting end 362 and the second connecting end 364 to the fixing plate 32 and the sliding plate 34 respectively.

The swing rod 40 can be a bar and define two connecting holes 42 at its two ends. The connecting holes 42 are for rotatably engaging the first connecting shaft 142 of the housing 10 and the second connecting shaft 242 of the cover 20.

To assemble the electronic device 100, the first connecting end 362 of the elastic member 36 is secured with the first fixing hole 324 of the fixing plate 32 by latching of a pin. The second connecting end 364 of the elastic member 36 is secured with the second fixing hole 344 of the sliding plate 34. The guiding grooves 342 of the sliding plate 34 slidably receive the guiding rails 322. The elastic member 36 is assembled between the fixing plate 32 and the sliding plate 34, and is slanted relative to the sliding direction of the sliding plate 34. The sliding mechanism 30 is placed into the assembling cavity 12 of the housing 10, and the fixing plate 32 is fixed to the bottom of the assembling cavity 12.

The extending arms 343 of the sliding plate 34 rotatably connect to the cover 20, the tail end of each extending arm 343 are inserted into the connecting slot 22 of the cover 20, and the linking post 222 are rotatably engaged into the hinging hole 3432 of the extending arm 343. The swing rods 40 are connected with the housing 10 and the cover 20. The connecting holes 42 of each swing rod 40 are respectively rotatably engaged with the first connecting shaft 142 of the housing 10 and the second connecting shaft 242 of the cover 20, and the swing rod 40 is received in the room cooperatively enclosed by the first receiving slot 14 and the correspondingly second receiving slot 24. Therefore, the electronic device 100 is assembled.

Figure 3:
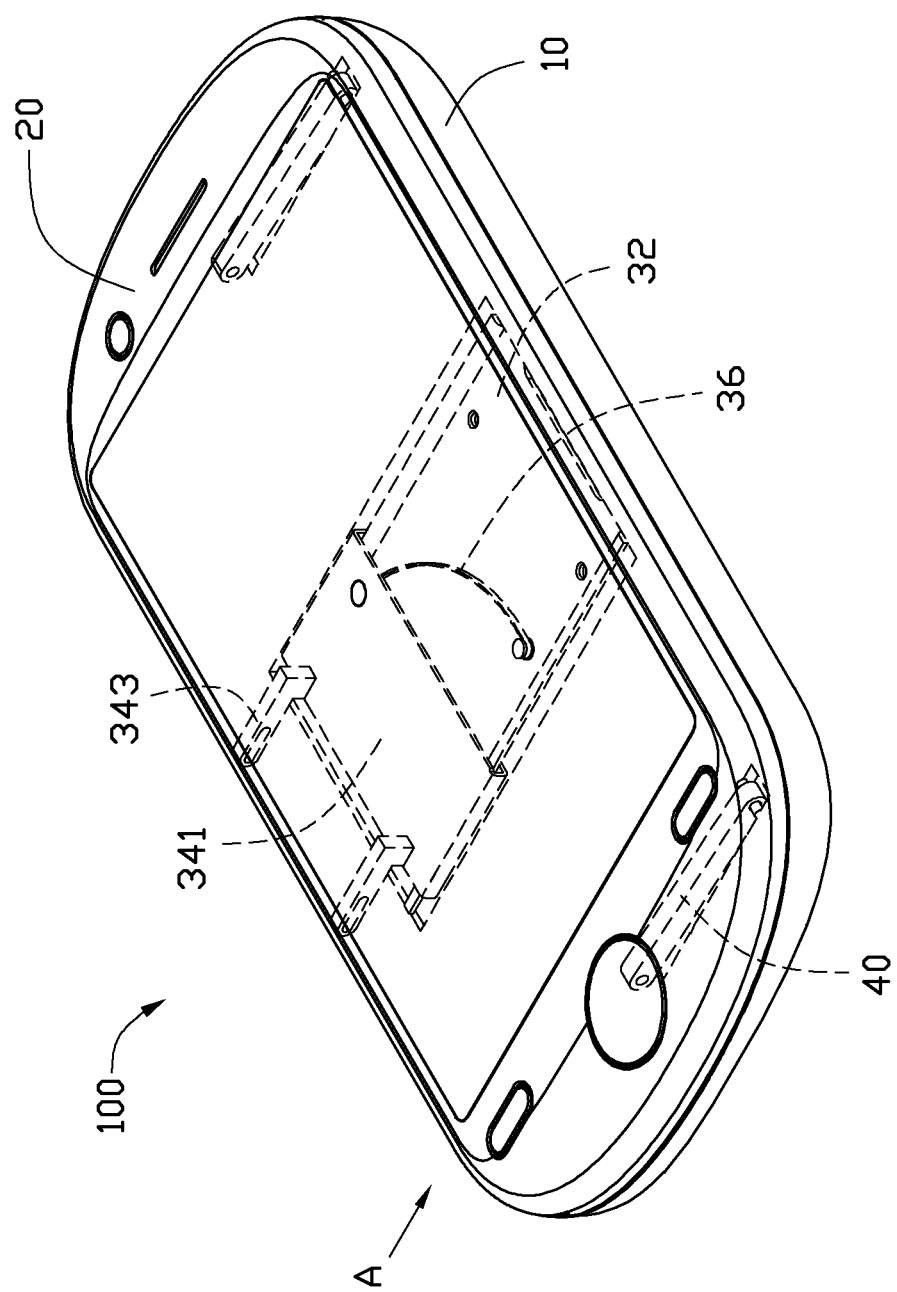
FIG. 3 is a perspective view of the electronic device shown in FIG. 1 with the cover closed.
Figure 4:
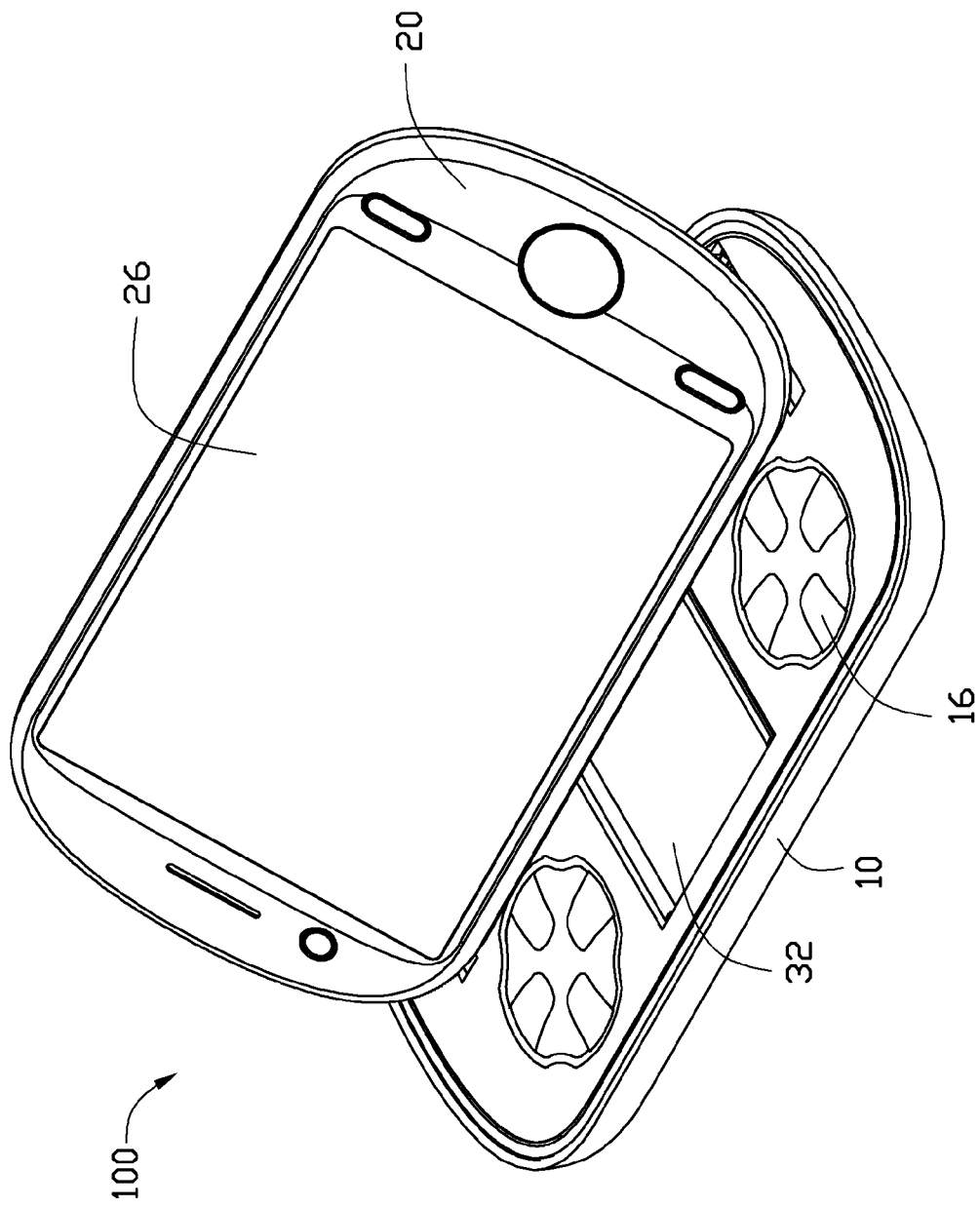
FIG. 4 is a schematic view of the electronic device shown in FIG. 1 with the cover open.
Figure 5:
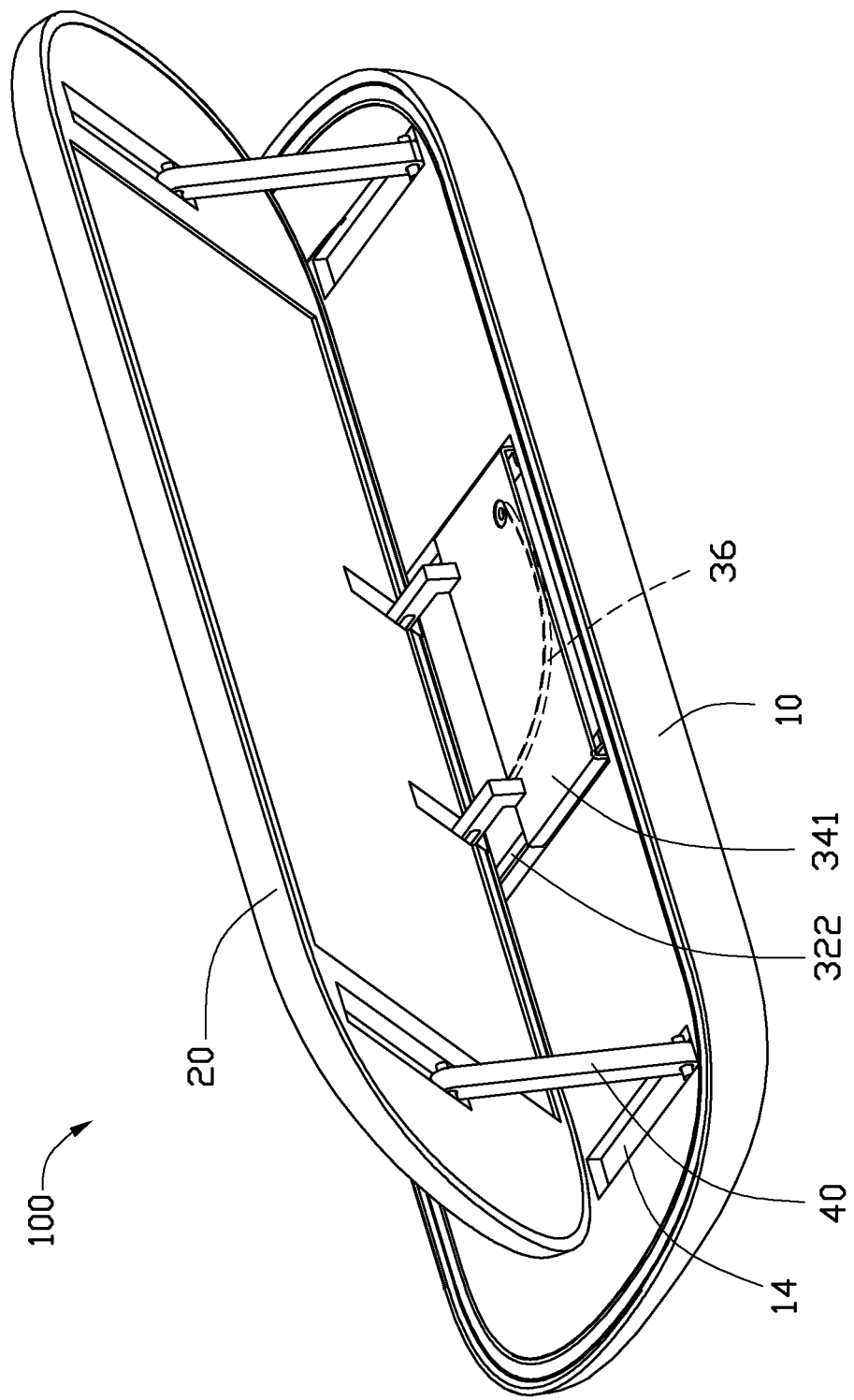
FIG. 5 is a schematic view of the electronic device shown in FIG. 4, but from another view.

Referring to FIG. 3, the cover 20 is closed, the sliding plate 34 is located at an end of the fixing plate 32, the extending direction from the first connecting end 362 pointing to the second connecting end 364 is slanted relative to the sliding direction of the sliding plate 34. The elastic member 36 is compressed, and each extending arm 343 of the sliding plate 34 is respectively received in one of the connecting slots 22 of the cover 20. Each swing rod 40 is received in the space cooperatively enclosed by the first receiving slot 14 and the correspondingly second receiving slot 24.

As the cover 20 is pushed along the direction of arrow A shown in FIG. 3, the cover 20 slides and carries the sliding plate 34 to slide toward the other end of the fixing plate 32. Due to the rotatable connection of the two ends of the swing rod 40 with the housing 10 and the cover 20, the swing rods 40 rotate and lift an end of the cover 20, and the other end of the cover 20 abuts against and slides relative to the upper surface of the housing 10. Thus, the cover 20 slides and tilts with respect to the housing 10. At the same time, the sliding plate 34 slides along the fixing plate 32, the elastic member 36 is compressed further and accumulates more potential energy. After the sliding plate 34 slides a predetermined distance, the elastic member 36 starts to release the energy and the sliding plate 34 slides automatically, until the sliding plate 34 slides to the other end of the fixing plate 32 and can not slide any further. The swing rods 40 rotate to a predetermined angle and cannot rotate any further, and the sliding plate 34 and the swing rods 40 are maintained steadily. The cover 20 is opened substantially and is tilted relative to the housing 10.

To close the cover 20, the tilted end of the cover 20 is pressed downwardly. During this process, the swing rods 40 rotate in reverse, and the sliding plate 34 slides along the fixing plate 32 and restores to the original position.

It is to be understood, the swing arms 40 can be a single arm, with two ends of the swing arm 40 rotatably connecting to the cover 20 and the housing 10 respectively.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A tilting portable electronic device, comprising:
a housing;
a cover;
a sliding mechanism including a fixing plate, a sliding plate slidably engaging with the fixing plate, and an elastic member connecting the fixing plate and the sliding plate, the fixing plate being fixed to the housing; and
at least one swing rod with the two ends rotatably connecting to the cover and the housing;
wherein an end of the sliding plate rotatably connects to the cover, and wherein when the cover is pushed, the swing rod rotates to support an end of the cover, the sliding plate slides along the fixing plate, causing the other end of the cover to slide along the surface of the housing, and after the sliding plate slides a predetermined distance, the elastic member releasing potential energy to drive the sliding plate to slide automatically, and the cover opens tilted relative to the housing.

2. The tilting portable electronic device as claimed in claim 1, wherein the housing defines an assembling cavity for receiving the sliding mechanism, the fixing plate is fixed in the assembling cavity.

3. The tilting portable electronic device as claimed in claim 1, wherein the cover defines two connecting slots, each connecting slot substantially adjacent to an end of the cover, the sliding plate forms two extending arms, each extending arm is inserted into one of the connecting slots to rotatably connect to the cover.

4. The tilting portable electronic device as claimed in claim 3, wherein the connecting slot has a linking post assembled therein, the extending arm defines a hinging hole for engaging the linking post.

5. The tilting portable electronic device as claimed in claim 1, wherein the housing defines two first receiving slots, the cover defines two second receiving slots corresponding to the two first receiving slots, the two ends of each swing rod are respectively placed into one of the first receiving slot and one of the second receiving slot to rotatably connect the cover and the housing.

6. The tilting portable electronic device as claimed in claim 5, wherein the first receiving slot has a first connecting shaft assembled therein, the second receiving slot has a second connecting shaft assembled therein, the swing bar defines two connecting holes at two ends to engage with the first connecting shaft and the second connecting shaft respectively.

7. The tilting portable electronic device as claimed in claim 1, wherein the fixing plate defines a first fixing hole, and the sliding plate defines a second fixing hole, the two ends of the elastic member respectively engage into the first fixing hole and the second fixing hole.

8. The tilting portable electronic device as claimed in claim 1, wherein the elastic member is a torsion spring.

9. The tilting portable electronic device as claimed in claim 1, wherein the elastic member is a coiled spring.

10. The tilting portable electronic device as claimed in claim 1, wherein the housing has at least one keypad set on the upper surface, the cover has a display set on the top surface, after the cover is opened, the display is slanted relative to the keypad.

11. A tilting portable electronic device, comprising:
a housing;
a cover;
a sliding mechanism connecting to the housing and the cover; and
at least one swing rod with the two ends rotatably connecting to the cover and the housing;
wherein the sliding mechanism includes a fixing plate, a sliding plate slidably engaging with the fixing plate, and an elastic member connecting the fixing plate and the sliding plate, the fixing plate is secured to the housing; the sliding plate rotatably connect to an end of the cover; and wherein when the cover is pushed from one end, the sliding plate slides to take the end of the cover sliding, the swing rod rotates to support the opposite other end of the cover, and after the sliding plate slides a predetermined distance, the elastic member releasing energy to drive the sliding plate slide automatically, and the cover opens tilted relative to the housing.

12. The tilting portable electronic device as claimed in claim 11, wherein the housing defines an assembling cavity for receiving the sliding mechanism, the fixing plate is fixed in the assembling cavity.

13. The tilting portable electronic device as claimed in claim 11, wherein the cover defines two connecting slots, the sliding plate forms two extending arms, each extending arm is inserted into one of the connecting slots to rotatably connect to the cover.

14. The tilting portable electronic device as claimed in claim 11, wherein the housing defines two first receiving slots, the cover defines two second receiving slots corresponding to the two first receiving slots, the two ends of each swing rod are respectively placed into one of the first receiving slot and the one of the second receiving slot to rotatably connect the cover and the housing.

15. The tilting portable electronic device as claimed in claim 11, wherein the fixing plate defines a first fixing hole, and the sliding plate defines a second fixing hole, the two ends of the elastic member respectively engage into the first fixing hole and the second fixing hole.

\* \* \* \* \*